US012345252B2

(12) United States Patent
Hansen et al.

(10) Patent No.: US 12,345,252 B2
(45) Date of Patent: Jul. 1, 2025

(54) SYSTEM FOR CALIBRATION OF ELECTROHYDRAULIC PUMP START CURRENT BASED ON ENGINE'S OUTPUT TORQUE SIGNAL

(71) Applicant: Danfoss Power Solutions Inc., Ames, IA (US)

(72) Inventors: Thomas Traeger Hansen, Nordborg (DK); Simon Nielsen, Nordborg (DK)

(73) Assignee: Danfoss Power Solutions Inc., Ames, IA (US)

( * ) Notice: Subject to any disclaimer, the term of this patent is extended or adjusted under 35 U.S.C. 154(b) by 0 days.

(21) Appl. No.: 18/048,703

(22) Filed: Oct. 21, 2022

(65) Prior Publication Data

US 2023/0140728 A1 May 4, 2023

Related U.S. Application Data

(60) Provisional application No. 63/272,996, filed on Oct. 28, 2021.

(51) Int. Cl.
*F04B 49/06* (2006.01)
*F04B 17/03* (2006.01)
(Continued)

(52) U.S. Cl.
CPC .............. *F04B 49/06* (2013.01); *F04B 17/03* (2013.01); *F04B 51/00* (2013.01); *F15B 11/161* (2013.01);
(Continued)

(58) Field of Classification Search
CPC .... F15B 11/161; F15B 2211/633; F15B 15/18
See application file for complete search history.

(56) References Cited

U.S. PATENT DOCUMENTS 5,628,187 A 5/1997 Gollner
2011/0146261 A1* 6/2011 Tevis ...................... F15B 1/024 60/459

(Continued)

FOREIGN PATENT DOCUMENTS

DE 4423736 A1 * 1/1995 ......... F04D 15/0066
DE 19524669 A1 3/1999

(Continued)

OTHER PUBLICATIONS

Extended European Search Report; European Patent Application No. 22204395.2-1004, Mar. 10, 2023; 7 pages; Danfoss Power Solutions Inc.

(Continued)

*Primary Examiner* — Kenneth J Hansen
(74) *Attorney, Agent, or Firm* — ZarleyConley PLC

(57) ABSTRACT

A system for calibrating an electrohydraulic pump using a micro-controller that has software that may command the engine to a speed value and to uncommand the electrohydraulic pump such that a baseline engine load is defined. The software may also, thereafter, command the electrohydraulic pump to ramp up until the electrohydraulic pump goes into stroke thereby increasing the engine load to an amount over the baseline engine load. When this occurs, the software may define a start current value for that direction of the electrohydraulic pump.

19 Claims, 2 Drawing Sheets

(51) Int. Cl.
*F04B 51/00* (2006.01)
*F15B 11/16* (2006.01)

(52) U.S. Cl.
CPC ................. *F04B 2203/0201* (2013.01); *F04B 2203/0603* (2013.01)

(56) References Cited

U.S. PATENT DOCUMENTS

| | | | | |
|---|---|---|---|---|
| 2014/0180550 | A1* | 6/2014 | Vora ........................ | E02F 3/841 701/50 |
| 2021/0156373 | A1 | 5/2021 | Shimamoto et al. | |

FOREIGN PATENT DOCUMENTS

| | | | | |
|---|---|---|---|---|
| EP | 1382891 | A2 * | 1/2004 | ............. F16D 48/08 |
| EP | 4273398 | A1 * | 11/2023 | .............. F04B 1/295 |
| JP | 2014198482 | A | 10/2014 | |
| WO | 1999061964 | A1 | 12/1999 | |

OTHER PUBLICATIONS

JP2014198482A—English Translation Abstract.
DE19524669A1—English Translation.
European Office Action; European Patent Application No. 22204395.2-1004, Jan. 14, 20205; 6 pages; Danfoss Power Solutions Inc.

* cited by examiner

SYSTEM FOR CALIBRATION OF ELECTROHYDRAULIC PUMP START CURRENT BASED ON ENGINE'S OUTPUT TORQUE SIGNAL

CROSS REFERENCE TO RELATED APPLICATION

This application claims the benefit of U.S. Provisional Application Ser. No. 63/272,996 filed Oct. 28, 2021, the content of which is hereby incorporated by reference in its entirety.

BACKGROUND OF THE INVENTION

The present invention is directed to the calibration of electrohydraulic propel systems. More specifically, the invention is directed to the calibration of the start current parameters of an electrohydraulic pump including both a forward start current value and a reverse start current value for each pump.

Due to design tolerances and other variations that exist in the manufacturing of hydrostatic components such as variable displacement, axial-piston pumps, it is often necessary to "calibrate" each component at the end of assembly and/or after it is built into a full system on a vehicle. The calibration procedures are normally focused on identifying the values of the control inputs that correlate to different operational conditions of the pump or the overall system. In example, the calibration establishes a relationship between the control input to a pump and its resulting behavior in different conditions.

Widely known in the industry is that calibration of the pump and motor on each vehicle is necessary to optimize the performance of advanced electrohydraulic propel systems and maintain consistent performance from vehicle to vehicle. The pump start current is an especially important parameter, as it is used to bring the pump into stroke and the vehicle into motion as a drive pedal or other input device is controlled. In practice, the pump's start current can vary considerably and still be considered "in spec." An incorrect parameter value for the start current could cause a vehicle to jump into motion, experience a large dead band or delay between depression of the drive pedal and the start of the vehicle motion, or cause the overall vehicle controllability to be perceived as poor.

In recent years there has been an increasing focus in the market on simplifying and improving the process of calibrating and configuring a vehicle. Overall, it is desired to have a robust pump calibration procedure that runs automatically and does not rely upon the presence of additional sensors or the direct interaction of a skilled technician.

While there are multiple ways to perform the start current calibration, presently there are four common methods. One system uses pressure sensors to provide feedback to the controller to indicate what level of control current generates a threshold level of pressure as a pump goes into stroke in a blocked-port or locked-motor condition. The main disadvantage of this system is that most vehicles in this market do not have system pressure sensors installed as factory equipment due to the added cost and complexity. These machine markets are very competitive and price-sensitive, and even a relatively inexpensive pressure sensor will be omitted if its function cannot be fully justified. Some vehicle OEMs will install temporary system pressure sensors at the end of their assembly process in order to perform a high-quality system calibration. This step adds time and complexity to their assembly process and even increases the risk of introducing contamination into the circuit as pressure sensors are added and removed. This approach also necessitates the use of special equipment by a vehicle service center in case they need to repair or replace a component during the vehicle's lifetime.

Another method uses a type of "driving" calibration, where the vehicle is either driven on a test track or with wheels in the air. This procedure increases the control current slowly until the motor is detected to be moving and then saves the value as a start current. The main disadvantage of this method is that it requires the availability of a suitable test area and test operator, or it requires the vehicle to be jacked up into the air before it can be performed. Also, a disadvantage is that the accuracy of the method could depend on the rolling resistance at the location of the test.

A further method uses a test operator or technician with sufficient skill to manually adjust the start current parameters on the vehicle and observe the impact on the vehicle. This is an iterative process of making a change and then testing the performance until the result meets their expectations. The main disadvantage of this method is that it requires a test area and a skilled technician that is capable of determining when the vehicle has reached a proper level of performance. Otherwise, the quality of the outcome could vary. Also, the process is iterative and somewhat slow.

A newer method that has been developed in recent years involves the pump manufacturer performing special tests on each pump at their factory, saving the results in a database, and then making specific pump parameter data available to the machine OEM after assembling the pump into a machine. This method relies on identifying each pump by its serial number and accessing the parameters (such as the start current) from a cloud server or other database. The main disadvantage of this method is that it requires IT systems to be installed at the vehicle OEM that enable rapid identification of a pump's serial number and acquisition of parameters from an online database. This could be considered expensive and cumbersome to many OEMs. Also, the method is only useful during initial machine startup and is not helpful during the service life of the vehicle or in case of a repair.

To overcome these disadvantages, it is desirable to not use extra sensors and instead use load signals that are present on nearly all modern vehicles with electronically-controlled engines. Another desire is to use a stationary procedure that can be performed with wheels on the ground, possibly as part of an end-of-line test at the vehicle factory. Another desire is to use a procedure that can run and produce results automatically based on intelligent software logic with no manual adjustments or operator judgment required. A still further desire is to have a procedure that can be re-run at any time during the life of the vehicle without the need for special equipment or skilled technicians. This would mean the vehicle can be easily recalibrated after service or other repairs are made and can enable the vehicle performance to be maintained at a high level even as components wear. Finally desired is a procedure that eliminates the need for special calibration procedures during pump assembly, which potentially would increase the overall assembly time.

These and other objectives, features, and advantages of the invention will become apparent from the specification and claims.

SUMMARY OF THE INVENTION

A system for calibrating an electrohydraulic pump includes a vehicle with a propel system that includes an engine connected to an electrohydraulic pump. A micro-controller having software and an input device is connected to a plurality of sensors mounted about the vehicle. The software uses a plurality of parameters to convert internal analog drive signals into analog output signals to control the electrohydraulic pump and motion of the machine where the parameters include a forward start current value and a reverse start current value.

In one example the sensors are load sensors and the electrohydraulic pump is a non-feedback electric controlled pump. The start current value brings the electrohydraulic pump into stroke as the input device is controlled by an operator and the calibration process is initiated by using a button on a service tool. The software commands a hydraulic motor to a displacement between 0% and 25% and in one example between 20% and 25%. The flow is pumped into a dead volume and is not consumed by a working device.

To determine a baseline engine load the software commands the engine to a constant speed and un-commands the electrohydraulic pump. The software also ramps up the electrohydraulic pump to determine a configurable minimum value at a configurable rate. The software determines and stores a start current based on an increase in a torque signal by a configurable amount over a baseline of the electrohydraulic pump value. The process is repeated to determine the reverse start value.

DETAILED DESCRIPTION

Figure 1:
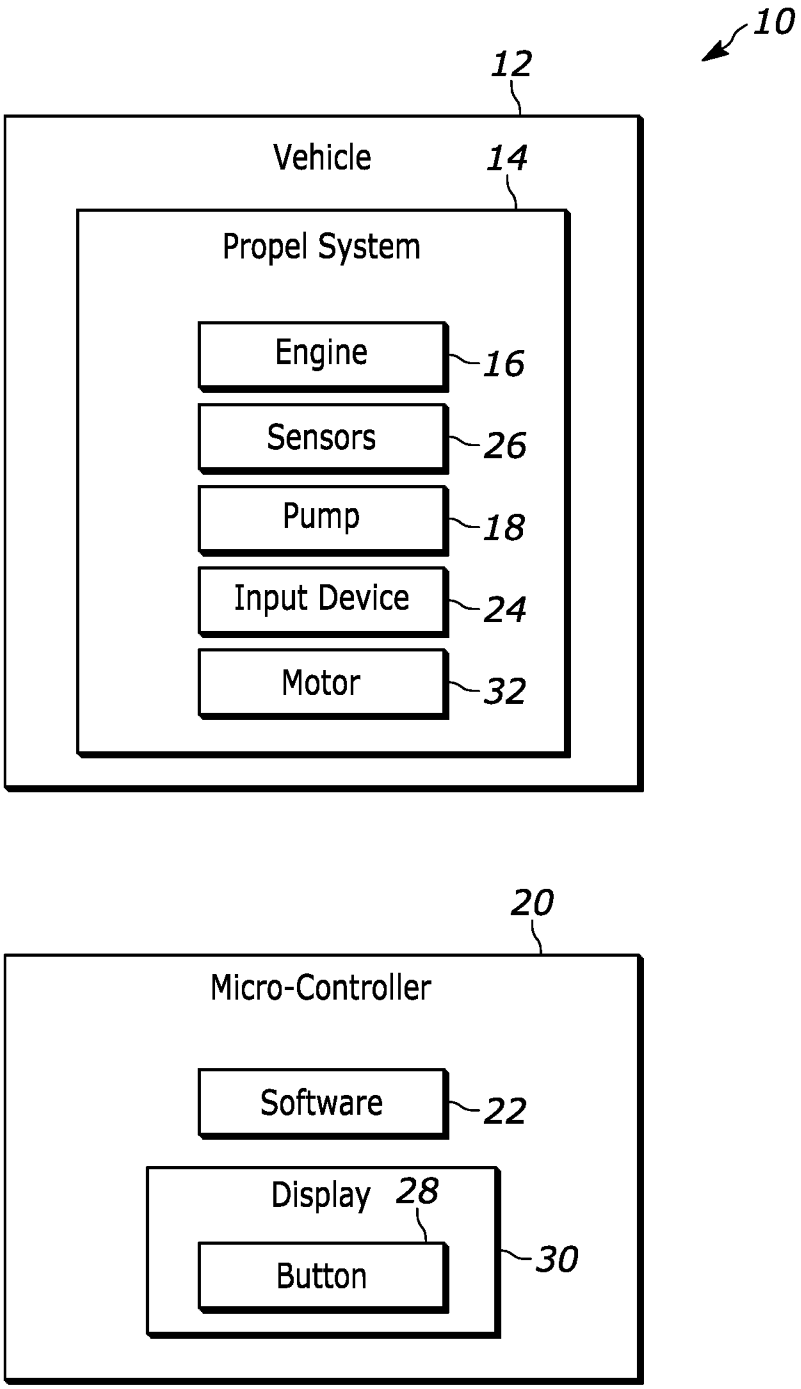
FIG. 1 is a schematic view of an environment for a system for calibrating an electrohydraulic pump.
Figure 2:
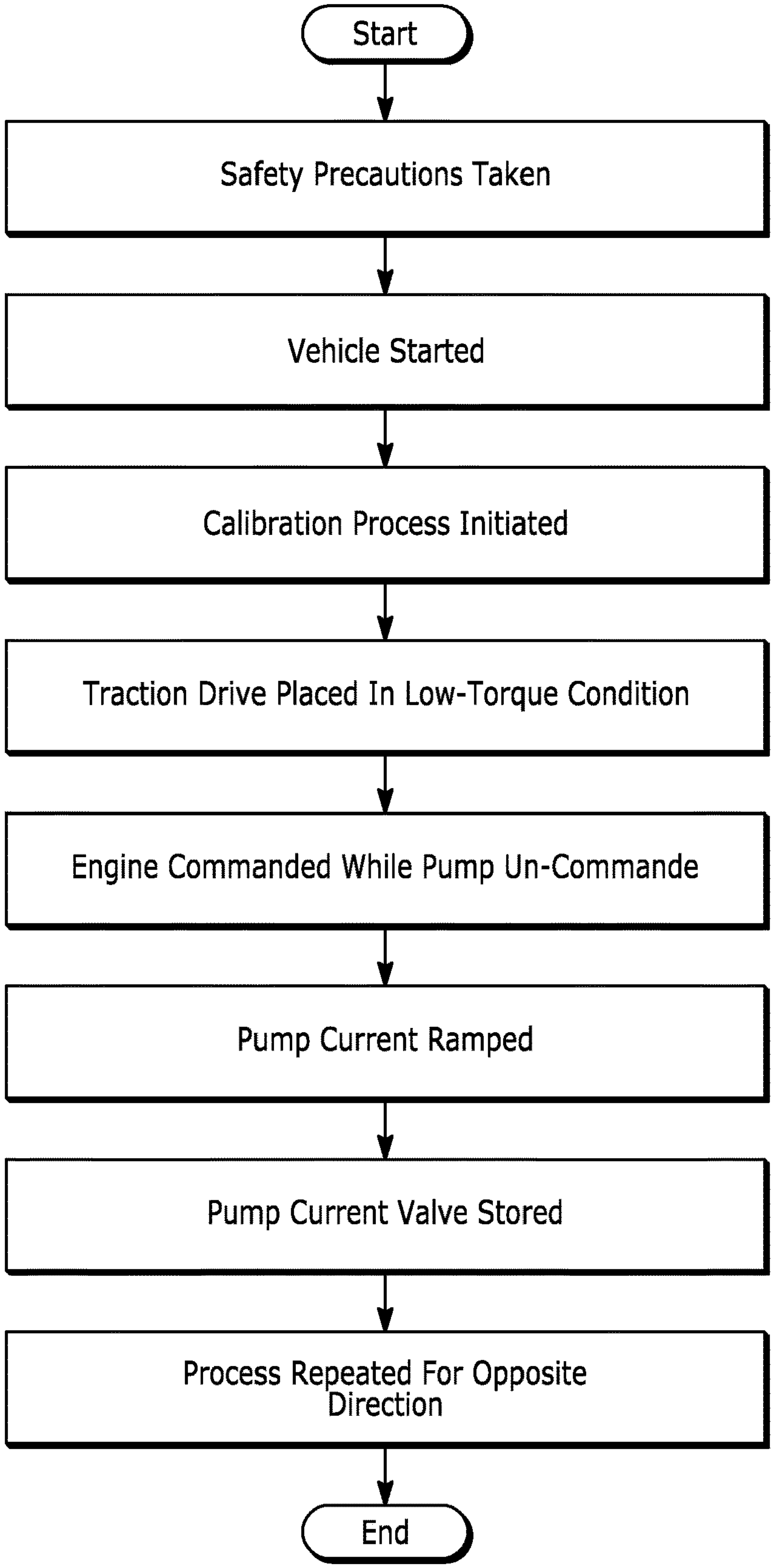
FIG. 2 is a flow diagram for a system for calibrating an electrohydraulic pump.

Referring to the Figures, the system 10 for calibrating an electrohydraulic pump start current based upon an engine's output torque signal includes a vehicle or machine 12 having a propel system 14. The propel system 14 includes an engine 16 connected to an electrohydraulic pump 18. While any number of applications of pump control types and vehicle applications can be used, preferred is that the system is used with Non-Feedback Proportional Electric (NFPE) controlled pumps used in automotive control systems commonly implemented on construction vehicles such as wheel loaders, telehandlers, dumpers, and the like.

The system 10 further includes a micro-controller 20 with software 22, an input device 24 such as a drive pedal, and sensors 26. While any type of sensor 26 is used, preferably load sensors that are present on modern vehicles with electronically-controlled engines are desired. In some examples there is no physical load or torque sensor, and instead the signal is calculated or estimated internally by the engine control unit 20 (ECU). The software uses a plurality of parameters to convert internal analog drive signals into analog output signals to control the pump 18 and the motion of the machine 12. Included in these parameters are a forward start current value and a reverse start current value. The start current value is an especially important parameter as it is used to bring the pump into stroke and the vehicle into motion as the input device 24 is controlled by an operator.

In operation, in case of a failure where the vehicle 12 could unexpectedly go into motion, even though most likely at a relatively low ground speed, initial safety precautions are taken. As examples, the vehicle is restrained to the ground with safety chains, placed directly in front of an immovable wall or other object, or lifted with the wheels in the air. The vehicle 12 is then started and will remain in a stationary position throughout the process. With the operator seated in the cab, the calibration process is initiated by pressing a button 28 on a service tool 30 or a special display screen in the cab. For accuracy, the engine crankcase oil temperature and hydraulic oil temperature must begin within configurable ranges before the process can continue, otherwise the process will abort. This prevents the process from being conducted in extreme conditions that could affect the accuracy of the measurements.

The traction drive is automatically placed in a low-torque condition by the software 22. To achieve this the software 22 commands a hydraulic motor 32 to its minimum displacement which typically is 20-25% or as low as 0% displacement, shifts a multi-speed gearbox (if present) to the highest gear, automatically applies or requires manual application of a park brake, and requires the operator to press and hold the service brake pedal at all times. The process involves running a blocked port procedure on the vehicle 12 in which the vehicle's traction drive output is held stationary by its onboard braking system and the pump command current is increased from a lower starting value until the pump increases in displacement. In the process any flow is being pumped into a dead volume and is not being consumed by any connected working device like the hydraulic motor 32.

The accuracy of the process relies on all torque loads on the engine, except for the torque from the propel pump being calibrated, remaining relatively constant. To avoid inaccuracies, any variable loads coming from other sources such as AC compressors, open-circuit pumps, or other auxiliary loads should be disabled or remain deactivated until the process is completed. If an auxiliary load activity is detected, such as joystick or steering wheel movement, or if the engine load measurement ever changes at an unacceptable rate or an unacceptable amount, the process will be aborted.

With the safety considerations observed and the starting conditions met, the engine 16 is commanded by the software to a constant speed value while the pump is un-commanded, to produce a baseline engine load that can be measured. In Automotive Control systems, the commanded speed value reflects the engine speed at which motion is first desired on low-resistance terrain and is referred to as the start speed. The baseline load value represents the load required to overcome the internal drag torque of the engine and any constant auxiliary loads. Modern engines with electronic control units (ECUs) normally output two signals indicating the engine load. For example, according to a J1939 CAN standard engine, the two signals are called "Actual Engine-Percent Torque" and "Engine Percent Load at Speed." These signals are an instantaneous estimation of the actual torque output by the engine and are present for nearly all modern vehicles with diesel engines. Either one of these signals can be used reliably as the reference torque signal for this process.

Next, the pump current is ramped up by the software 22 a configurable minimum value (mA) at a configurable rate (mA/s). The minimum value typically should be set somewhat below the normal start current range of the pump and could optionally take into account the pump control orientation and/or oil temperature, both of which have an effect. As the pump current increases, the pump will at some point go into stroke and begin building system pressure as it pumps against a stationary motor. The simultaneous displacement and pressure increases on the load torque of the pump and on the engine will be represented as an increase in the engine load signals. An increase in the load torque signal by a configurable amount over the baseline value the pump current value is stored as the start current in the micro-controller 20. The increase of the engine torque by a specified amount is then considered to indicate that the starting current for that direction of the pump has been reached. The process is then repeated for the other direction of the pump, and the overall process is then considered to be complete. More specifically, as the pump current to the Non-Feedback Proportional Electric (NFPE) control is ramped up from a minimum value, it reaches a value that actuates a valve and increases the pressure of the servo system. The servo pressure in the pump eventually increases to a value that causes the pump swashplate to swivel and bring the pump into stroke, thus increasing its displacement. As the pump increases in displacement and generates flow against a stationary motor, the system pressure increases. The simultaneous increases in system pressure and pump displacement require an increased driving torque from the prime mover, which is an engine in this example.

If desired, the process could automatically repeat a configurable number of times to ensure that there is agreement among the calibrated values on each side and to establish a final parameter value based on the average of multiple runs. Alternatively the oil temperature measured during the process could be used to automatically compensate or adjust the final start current value up or down based on the known impact of temperature on oil viscosity.

Additional safety measures can be implemented if certain conditions are detected during the process. For example, if during the process motor speed is detected, the brake pedal is released, the park brake is released, the operator leaves the seat, the motor feedback or other motor position sensor indicates a commanded position other than minimum displacement, and/or the gearbox switches indicate a gear position other than the highest gear, the process will abort automatically.

From the above discussion and accompanying figures and claims it will be appreciated that the system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A system for calibrating an electrohydraulic pump, comprising:

a machine having a propel system;

the propel system having an engine connected to an electrohydraulic pump;

a micro-controller having software in communication with the propel system; and the software having a calibration process comprising:

the software is configured to command the engine to a speed value and to uncommand the electrohydraulic pump such that a baseline engine load is defined and stored in the micro-controller;

the software, after the baseline engine load is defined, is configured to command the electrohydraulic pump to ramp up from a configurable minimum value at a configured rate until the electrohydraulic pump goes into stroke resulting in an increase in an engine load above the baseline engine load;

the software, after the increase in the engine load reaches a configurable amount over the baseline engine load, is configured to define a start current value for that direction of the electrohydraulic pump.

2. The system of claim 1 wherein the micro-controller is in communications with a plurality of load sensors.

3. The system of claim 1 wherein the electrohydraulic pump is a non-feedback proportional electric controlled pump.

4. The system of claim 1 further comprising a service tool in communication with the micro-controller to initiate the calibration process.

5. The system of claim 1 wherein the software commands a hydraulic motor of the machine to a displacement between 0% and 25% before the baseline engine load is defined.

6. The system of claim 5 wherein the software commands the hydraulic motor to a displacement between 20% and 25% before the baseline engine load is defined.

7. The system of claim 1 wherein when the software is configured to command the engine to the speed value, a flow of the electrohydraulic pump is pumped into a dead volume and is not consumed.

8. The system of claim 1 wherein the speed value is a constant speed.

9. The system of claim 8 wherein the speed value is a start speed.

10. The system of claim 1 wherein the configurable minimum value is below a normal start current range.

11. The system of claim 1 wherein the configurable minimum value is configured based on an orientation of the electrohydraulic pump.

12. The system of claim 1 wherein the machine is operated in a block port procedure during the calibration process.

13. The system of claim 1 wherein the machine remains stationary during the calibration process.

14. The system of claim 1 further comprising a device input connected to the micro-controller.

15. The system of claim 1 wherein the software is configured to use the start current value to bring the electrohydraulic pump into stroke and a motion of the machine while an input device of the machine is manually manipulated by an operator.

16. The system of claim 1 wherein the calibration process is aborted when at least one of a condition occurs selected from a group consisting of (a) an oil temperature exceeds a configurable range, (b) if an auxiliary load activity is detected; (c) a motor speed is detected, (d) a brake pedal is released, (e) a park brake is released, (f) an operator leaves a seat of the machine, (g) a motor position sensor indicates a commanded position other than a minimum displacement, and (h) a gearbox switch indicates a gear position other than a highest gear.

17. The system of claim 1 wherein the software is configured to automatically repeat the calibration process a configurable number of times to define a final parameter value based on an average outcome of a repetition of the calibration process.

18. The system of claim 1 wherein the software is configured to use a measured oil temperature to define a final start value based on a related oil viscosity at the measured oil temperature.

19. A method for calibrating an electrohydraulic pump, comprising:

providing a machine having a propel system, wherein the propel system has an engine connected to an electrohydraulic pump;

providing a micro-controller having software in communication with the propel system; and running a calibration process with the software, comprising:

(a) commanding the engine to a speed value and uncommanding the electrohydraulic pump;

(b) defining a baseline engine load;

(c) storing the baseline engine load in the micro-controller;

(d) commanding the electrohydraulic pump to ramp up from a configurable minimum value at a configured rate until the electrohydraulic pump goes into stroke resulting in an increase in an engine load above the baseline engine load; and (e) defining a start value for that direction of the electrohydraulic pump upon the engine load reaching a configurable amount over the baseline engine load.

* * * * *